United States Patent
Dunham et al.

(10) Patent No.: US 10,306,836 B2
(45) Date of Patent: Jun. 4, 2019

(54) TINE MOUNTING PADS

(71) Applicant: Vermeer Manufacturing Company, Pella, IA (US)

(72) Inventors: Lisle J. Dunham, Grinnell, IA (US); Alex Knee, Urbandale, IA (US); Tom Duenwald, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 15/183,219

(22) Filed: Jun. 15, 2016

(65) Prior Publication Data

US 2016/0366825 A1    Dec. 22, 2016

Related U.S. Application Data

(60) Provisional application No. 62/182,867, filed on Jun. 22, 2015.

(51) Int. Cl.
*A01D 80/02* (2006.01)
*A01D 89/00* (2006.01)

(52) U.S. Cl.
CPC .......... *A01D 80/02* (2013.01); *A01D 89/002* (2013.01)

(58) Field of Classification Search
CPC ...... A10D 80/02; A10D 89/002; A01B 23/02; A01F 15/106; A01D 57/02; A01D 89/00; A01D 89/008
See application file for complete search history.

(56) References Cited

U.S. PATENT DOCUMENTS

| | | | |
|---|---|---|---|
| 2,171,025 A | 8/1939 | Crumb et al. | |
| 2,237,002 A | 4/1941 | Kelley | |
| 2,364,303 A | 12/1944 | Martin | |
| 2,432,653 A | 12/1947 | Bloom | |
| 2,514,560 A | 7/1950 | Scranton | |
| 2,527,887 A * | 10/1950 | Martin | A01D 89/002 |
| | | | 100/100 |
| 2,607,182 A | 8/1952 | Hill | |
| 2,607,183 A | 8/1952 | Happe et al. | |
| 2,608,045 A | 8/1952 | Keene | |
| 2,608,046 A * | 8/1952 | Best | A01D 80/02 |
| | | | 56/400 |
| 2,657,521 A | 11/1953 | Happe | |
| 2,714,796 A | 8/1955 | Haupt et al. | |
| 2,724,491 A | 11/1955 | Orendorff | |
| 2,790,538 A * | 4/1957 | Collins | B65G 17/12 |
| | | | 198/692 |

(Continued)

FOREIGN PATENT DOCUMENTS

| CH | 382485 A | 9/1964 |
|---|---|---|
| DE | 1186256 | 1/1965 |

(Continued)

OTHER PUBLICATIONS

European Search Report, European Patent Application No. 16175026.0-1656, dated Nov. 11, 2016, pp. 9.

*Primary Examiner* — Arpad Fabian-Kovacs
(74) *Attorney, Agent, or Firm* — Armstrong Teasdale LLP

(57) ABSTRACT

Mounting pads for attaching tines to a pick-up device of a crop implement such as a round baler may include a tab that extends from a body portion. The tab may be hinged to the main body to allow the tab to loop around the connecting loop of the tine.

17 Claims, 11 Drawing Sheets

(56) References Cited

U.S. PATENT DOCUMENTS

| | | | | |
|---|---|---|---|---|
| 2,889,607 A * | 6/1959 | Irvine | | A01D 89/003 |
| | | | | 24/3.11 |
| 2,953,830 A * | 9/1960 | Macrae | | F16B 2/241 |
| | | | | 24/458 |
| 2,987,867 A * | 6/1961 | Erskine | | A01D 80/02 |
| | | | | 56/400 |
| 3,014,335 A | 12/1961 | Nolt | | |
| 3,099,347 A * | 7/1963 | Lee | | A01D 80/02 |
| | | | | 198/692 |
| 3,171,243 A | 3/1965 | Johnston | | |
| 3,206,920 A | 9/1965 | Hofer | | |
| 3,531,927 A | 10/1970 | Wood | | |
| 3,548,580 A | 12/1970 | Purrer et al. | | |
| 3,664,107 A | 5/1972 | Keller | | |
| 4,145,866 A * | 3/1979 | Zweegers | | A01D 78/08 |
| | | | | 56/400 |
| 4,161,859 A | 7/1979 | Storm et al. | | |
| 4,297,833 A | 11/1981 | Gaeddert | | |
| 4,342,366 A | 8/1982 | Schenk et al. | | |
| 4,473,994 A * | 10/1984 | Hein | | A01D 80/02 |
| | | | | 56/400 |
| 4,539,798 A | 9/1985 | Klinner | | |
| 4,545,188 A | 10/1985 | Klinner | | |
| 4,589,497 A | 5/1986 | Kovar | | |
| 4,630,432 A | 12/1986 | Love et al. | | |
| RE32,551 E * | 12/1987 | Doering | | A01D 42/02 |
| | | | | 172/622 |
| 5,027,907 A * | 7/1991 | Delyea | | A01B 19/02 |
| | | | | 172/707 |
| 5,042,243 A * | 8/1991 | Doering | | A01D 80/02 |
| | | | | 460/122 |
| 5,394,682 A | 3/1995 | Frimmel et al. | | |
| 6,327,840 B1 * | 12/2001 | Rumph | | A01D 89/002 |
| | | | | 56/341 |
| 7,516,604 B2 * | 4/2009 | Josset | | A01D 89/002 |
| | | | | 56/364 |
| 8,051,636 B2 | 11/2011 | McClure et al. | | |
| 8,209,947 B2 | 7/2012 | McClure et al. | | |
| 8,584,439 B2 | 11/2013 | Kuhn et al. | | |
| 9,192,101 B2 * | 11/2015 | McClure | | A01D 89/002 |
| 2006/0242937 A1 * | 11/2006 | Pourchet | | A01D 89/002 |
| | | | | 56/219 |
| 2008/0000212 A1 * | 1/2008 | Ubaldi | | A01D 89/002 |
| | | | | 56/364 |
| 2008/0141641 A1 * | 6/2008 | Derscheid | | A01D 80/02 |
| | | | | 56/341 |
| 2009/0025358 A1 | 1/2009 | Woodford | | |
| 2009/0056295 A1 | 3/2009 | Lolley | | |
| 2011/0225942 A1 | 9/2011 | McClure et al. | | |
| 2013/0167500 A1 | 7/2013 | Kuhn et al. | | |
| 2013/0327009 A1 | 12/2013 | McClure et al. | | |
| 2014/0260170 A1 * | 9/2014 | Denson | | A01D 89/00 |
| | | | | 56/364 |

FOREIGN PATENT DOCUMENTS

| | | | | |
|---|---|---|---|---|
| DE | 8525583 | | 10/1985 | |
| DE | 3722365 A1 | | 2/1988 | |
| DE | 102013105197 B3 | | 9/2014 | |
| DE | 102013109678 B3 | | 1/2015 | |
| EP | 97801 A1 * | | 1/1984 | A01D 80/02 |
| EP | 0178731 | | 4/1986 | |
| EP | 0760201 A1 * | | 3/1997 | A01D 80/02 |
| EP | 0903077 A1 | | 3/1999 | |
| EP | 1980144 A1 | | 10/2008 | |
| EP | 2384616 A1 * | | 11/2011 | A01D 80/02 |
| EP | 2384616 A1 | | 11/2011 | |
| EP | 2777378 A1 | | 9/2014 | |
| GB | 2193424 A * | | 2/1988 | A01D 80/02 |
| JP | 2015186458 A * | | 10/2015 | A01D 80/02 |

* cited by examiner

TINE MOUNTING PADS

CROSS-REFERENCE TO RELATED APPLICATION

This application claims the benefit of U.S. Provisional Patent Application No. 62/182,867, filed Jun. 22, 2015, the contents of which are incorporated herein by reference in their entirety.

FIELD OF THE DISCLOSURE

The field of the disclosure relates to mounting pads for attaching tines to a pick-up device of a crop implement such as a round baler.

BACKGROUND

Crop and forage implements have become an integral part of the agricultural industry and a variety of different types of crop implements such as crop harvesters (e.g., round balers, big or small square balers, peanut harvesters and pea harvesters) and windrow mergers are currently in use. Such crop implements may process any of the various agricultural crop products that have been cut and are to be retrieved from the ground, such as, but not limited to, hay, straw, and corn stover.

Such harvesting implements use a pick-up device to convey the crop material from the surface over which the implement travels and into the implement. The pick-up device typically includes a number of tines attached to a shaft or tine bar. The pick-up device rotates to allow the tines to grasp crop material and convey the material into the implement.

During use, the tines contact the ground and crop material causing a given tine to deflect from its resting position. The tine coil absorbs such forces and allows the tine arm to return to its resting position after deflection. Over time, the repeated stress may cause the tine to wear and even fail which results in less reliable crop pick-up and which may require the operator to stop operation of the implement for replacement of the tine.

A need exists for crop implement pick-up devices with improved durability and which are capable of absorbing large stresses caused by deflection over uneven terrain (e.g., uneven or rocky ground).

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a tine assembly for conveying crop material from a surface into an implement. The tine assembly includes a tine having a coil and an arm that extends from the coil. A connecting loop extends from the coil for attaching the tine to a tine support. The tine assembly includes a mounting pad that includes a body portion for mounting between the coil and the tine support. The body portion has a body aperture for receiving a given fastener to attach the body portion to the tine support. The mounting pad includes a tab that extends from the body portion for mounting between a given fastener and the connecting loop. The tab has a tab aperture for receiving the given fastener.

Another aspect of the present disclosure is directed to a pick-up device of a crop implement. The pick-up device includes a tine support and a metal tine. The metal tine includes a coil, an arm that extends from the coil and a connecting loop extending from the coil for attaching the tine to the tine support. The pick-up device includes a mounting pad disposed between the connecting loop and the support. The mounting pad comprises a material different than the tine.

Yet another aspect of the present disclosure is directed to a mounting pad for fastening a tine to a tine support of a pick-up device of a crop implement, the tine having an arm that extends from a coil and a connecting loop. The mounting pad includes a body portion for mounting between the tine and the tine support. The body portion has a body aperture for receiving a given fastener to attach the body portion to the tine support. The mounting pad includes a tab that extends from the body portion for mounting between a given fastener and the connecting loop. The tab has a tab aperture for receiving the given fastener.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
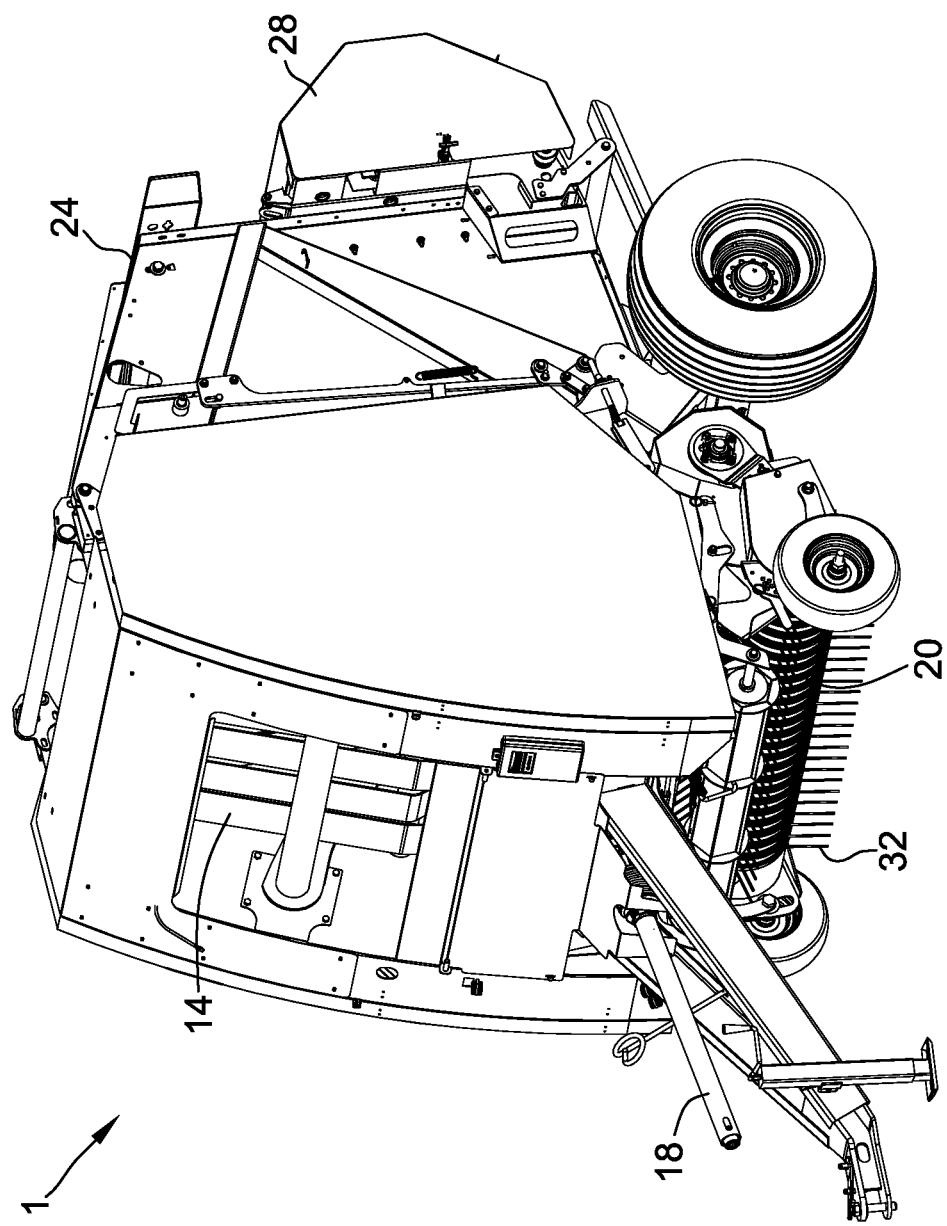
FIG. 1 is a perspective view of a crop implement shown as a round baler.
Figure 2:
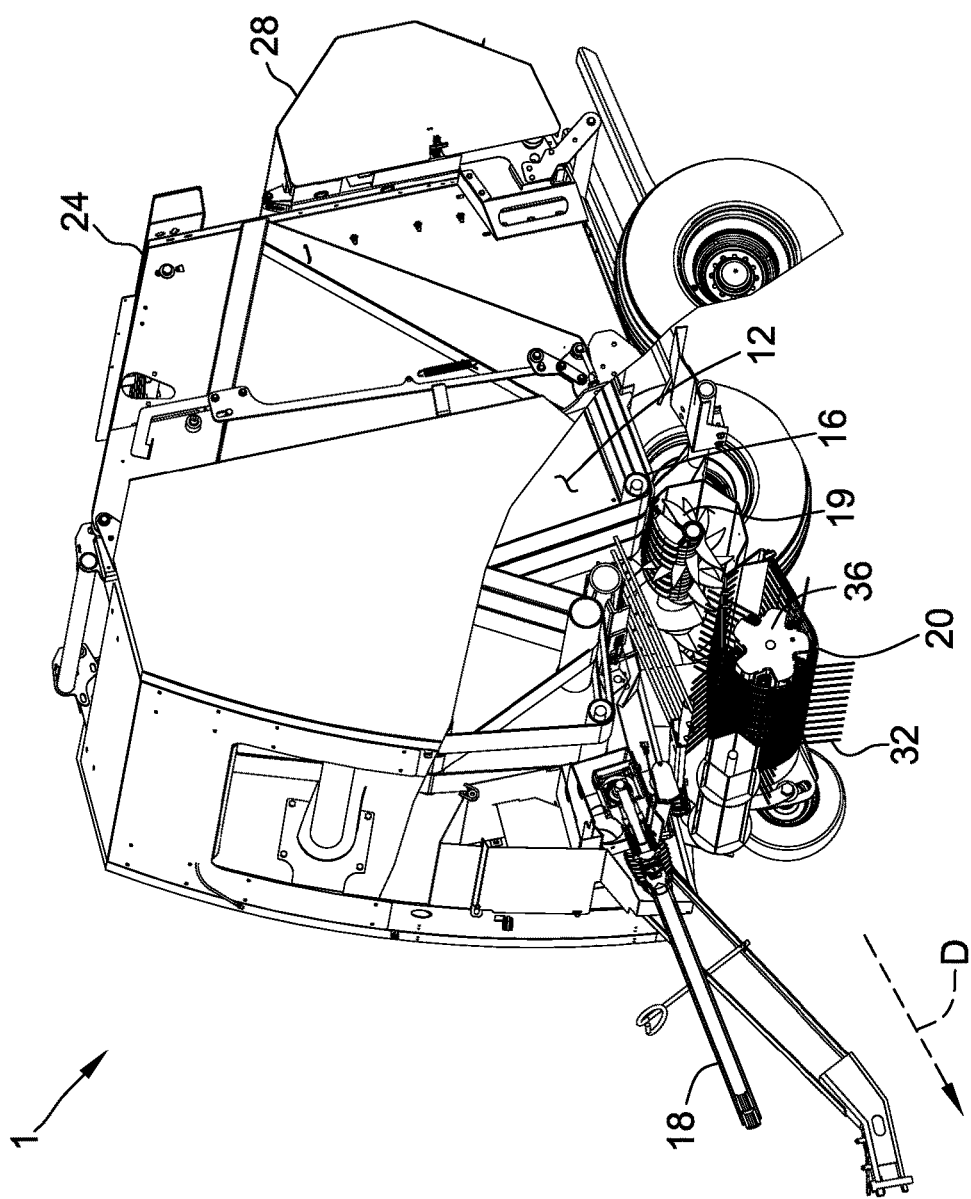
FIG. 2 is a perspective cross-section view of the round baler.

Referring now to FIGS. 1 and 2, an implement 1 for forming round bales from crop material is shown. While the implement 1 is generally shown and described herein as a round baler, any implement that includes a pick-up device 20 having tines 32 such as other crop harvesters, windrow mergers and the like may be used. The baler 1 includes an expandable baling chamber 12 which operates by utilizing a series of bale forming belts 14 routed around a series of rollers 16. Alternatively, a single bale forming belt may be utilized. Additionally, the baler includes a PTO drive 18, a single or a plurality of belt tighteners and a lift gate 24.

Material is picked up by the pick-up device 20 and transferred to a rotor assembly 19 that moves the crop material toward the baling chamber 12. As crop material is deposited in the baling chamber 12, the material is compressed by the plurality of bale forming belts 14. Tension is maintained in the bale forming belts 14 by the series of belt tighteners to ensure a properly compressed bale. Once a full bale (not shown) is formed, pickup is ceased, and a wrapping sequence is commenced by a wrapping device 28. The wrapping device 28 is configured to apply a layer of wrap material, to the outer circumference of the completed bale. Once the wrapping sequence is completed, the operator ejects the full bale from the baling chamber 12 by opening the lift gate 24.

Figure 3:
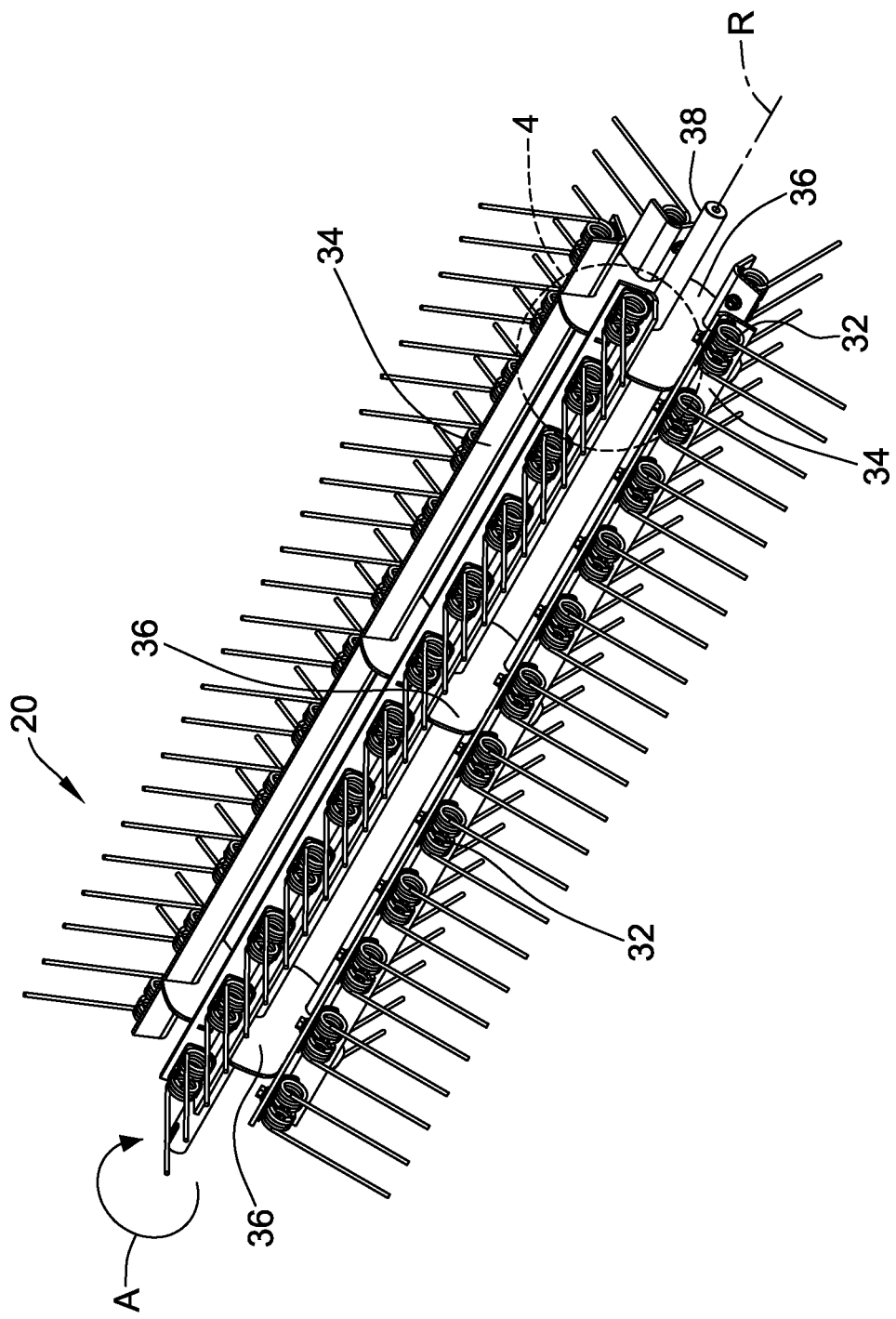
FIG. 3 is a perspective view of a pick-up device or "reel" of the round baler.

The pick-up device 20 (FIG. 3) includes a number of tines 32 for transferring crop material from the surface over which the baler 1 travels and into the baling chamber 12. As the tines 32 rotate about the axis of rotation R of the device 20 in the direction indicated by arrow A, the tines 32 pick-up crop material and direct it toward the baling chamber 12 (FIG. 3). The pick-up device 20 may include rows of tines 32 as shown in FIG. 3, or the tines 32 may be aligned in a staggered or "cammed" arrangement.

The pick-up device 20 includes a number of tine supports (shown as tine bars) 34 to which the tines 32 are attached. Each tine bar 34 is attached to supporting disks 36. A shaft 38 is attached to one or more supporting disks 36 for rotation of the pick-up device 20. Other arrangements of the pick-up device may be used in other embodiments (e.g., more or less disks 36, use of a shaft 38 that extends over the whole width, cammed tine arrangement, etc.).

Figure 4:
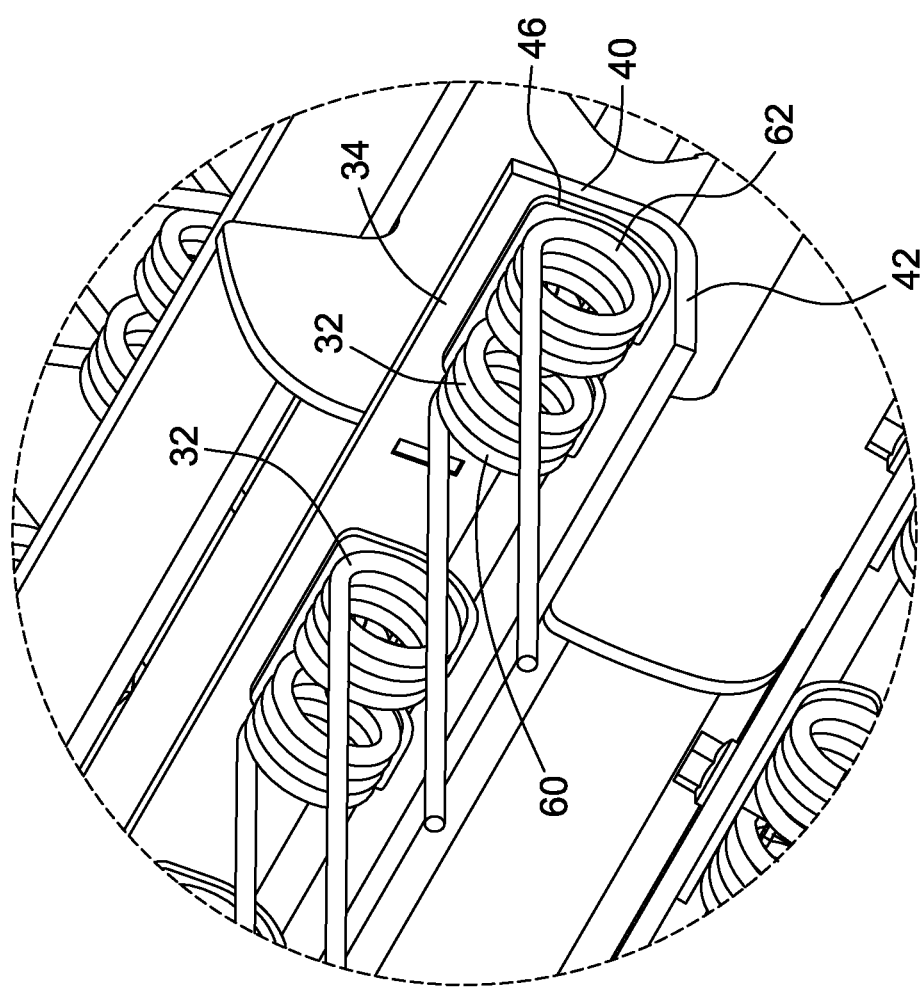
FIG. 4 is a detailed perspective view of a tine assembly and a tine bar of the pick-up device.

Referring now to FIG. 4, the tine bar 34 includes a base 40 that is attached to disks 36 (FIG. 3) and a sidewall 42 perpendicular to the base 40. The mounting pad 46 is disposed between the tine 32 and the tine bar 34 to prevent the tine 32 from contacting the tine bar 34 (i.e., base 40 and sidewall 42 as shown in FIG. 4).

Figure 5:
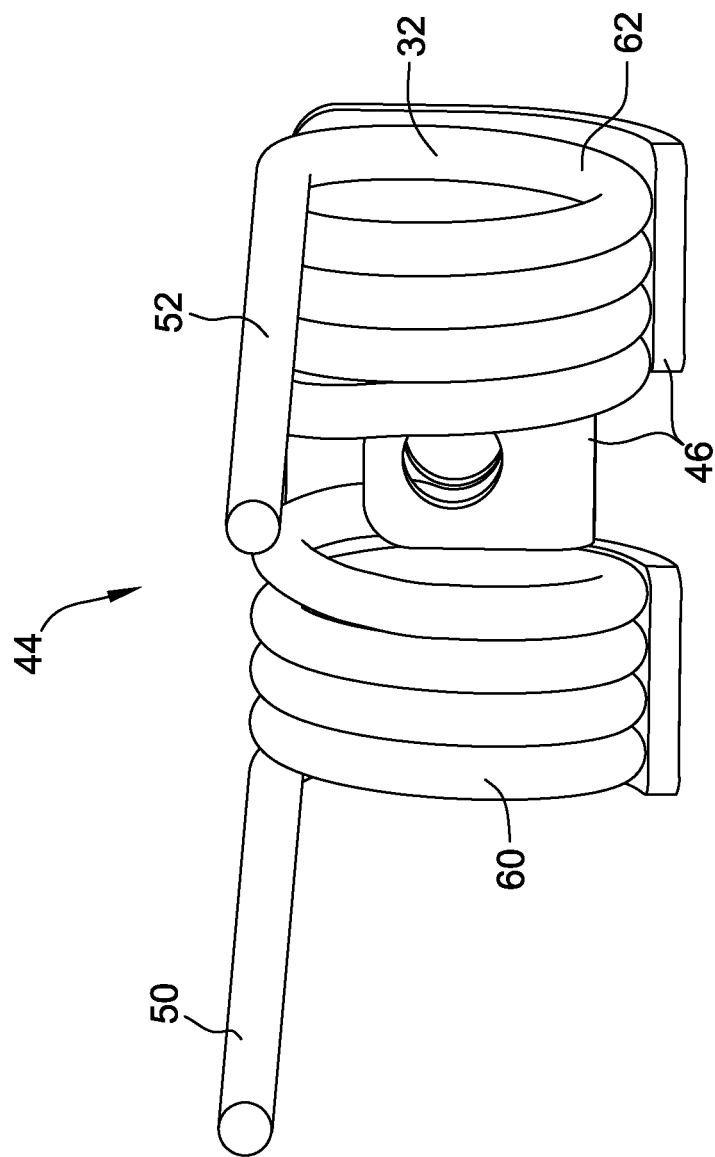
FIG. 5 is a perspective view of a tine assembly.
Figure 6:
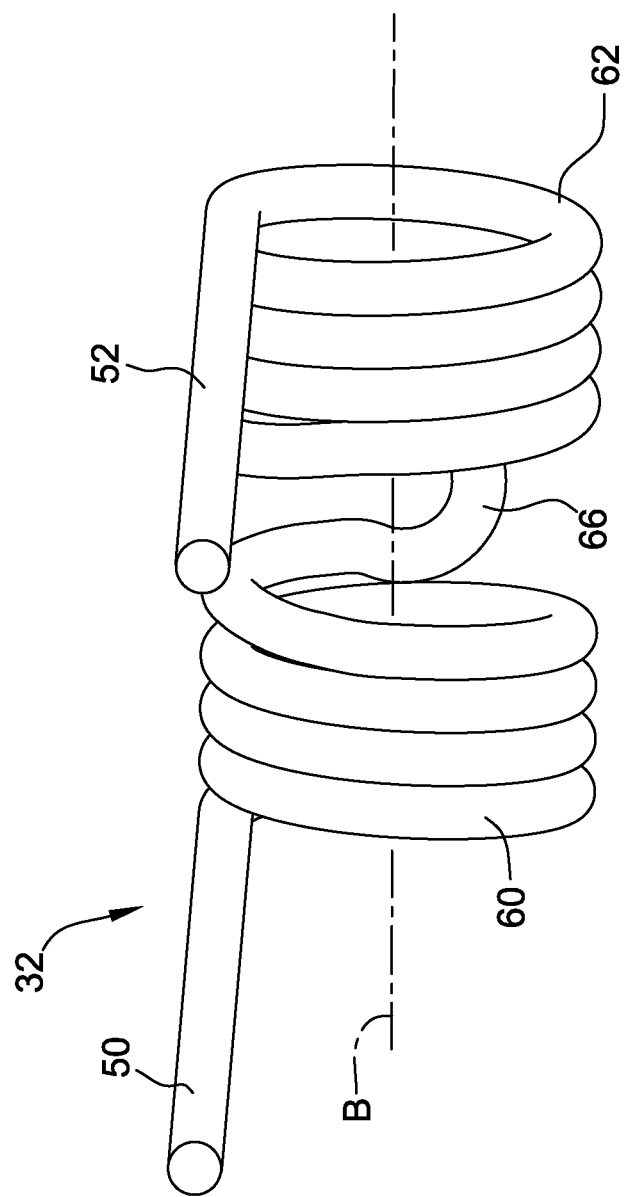
FIG. 6 is a partial perspective view of a tine.
Figure 7:
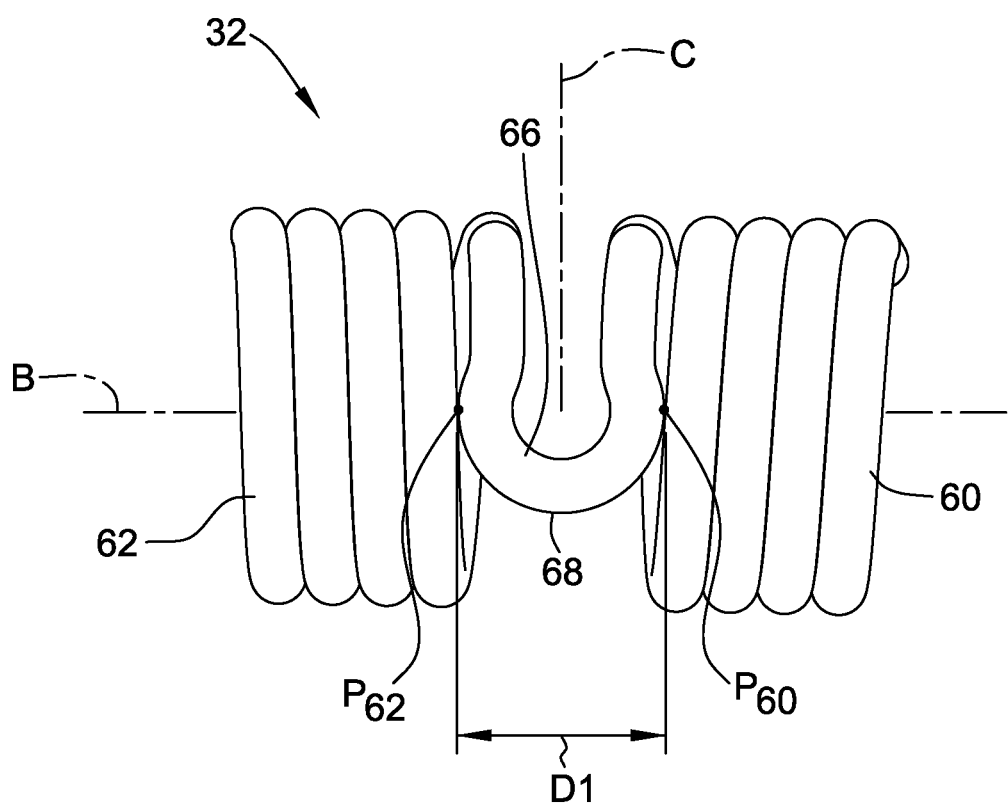
FIG. 7 is a rear view of the tine.

The tine 32 and mounting pad 46 together form a tine assembly 44 (FIG. 5). The assembly 44 may also include a fastener 80 (FIG. 9) that extends through the mounting pad 46 and a corresponding connecting loop 66 of the tine 32. Each tine 32 includes a first arm 50 (FIG. 6) that extends from a first spring coil (or simply "coil") 60 and a second arm 52 that extends from a second coil 62. The first and second coils 60, 62 have a common central axis B. The tine 32 also has a cross-wise axis C (FIG. 7) perpendicular to the central axis B and perpendicular to the tine arms 50, 52. The coils 60, 62 are joined by a connecting loop 66 that extends parallel to the central axis B (i.e., connects the loops laterally along the axis B). Generally, the connecting loop 66 begins when the winded cord of the coils 60, 62 moves beyond about a 45° angle with the cross-wise axis C (e.g., about points $P_{60}$, $P_{62}$ in FIG. 7). The connecting loop 66 has a width D1 (FIG. in 7) measured from the edges of the connecting loop nearest the coils 60, 62. As shown in FIG. 7, this distance $D_1$ corresponds to the distance between the first coil 60 and the second coil 62. The connecting loop 66 has a free end 68 opposite where the loop 66 begins (points $P_{60}$, $P_{62}$).

While the tines 32 are described and shown having two coils and two arms, tines having a single coil and a single tine may also be used without departing from the scope of the present disclosure. Such single coil tines include a mounting surface (e.g., connecting loop) to attach the tine to its support in the implement.

During use, the arms 50, 52 contact the crop material and lift the crop material upward into the implement 1. The arms 50, 52 contact crop material and also commonly engage the surface over which the implement travels. Contact with the material and the surface causes the arms 50, 52 to deflect. Deflection is resisted by coils 60, 62, which act to return the arms 50, 52 to their relaxed position.

Generally, the tines 32, tine bar 34 (FIG. 4) and fastener 80 (FIG. 9) are made of a metal (e.g., a single metal or a metal alloy like steel). The mounting pad 46 may be composed of a material different than the tines 32. The mounting pad 46 prevents the tines from directly contacting the tine bar 34. The mounting pad 46 may be composed of a material with a higher lubricity/lower coefficient of friction and/or a higher wear factor (which may be a product of higher hardness, greater toughness, etc., or a combination of such factors) relative to the tines 32 and/or tine bar 34. The mounting pad 46 may be composed of a polymer (e.g., ABS, nylon, nylon with embedded molybdenum disulfide, polyurethane) or a self-lubricated material (self-lubricated polytetrafluoroethylene (PTFE) or self-lubricated ceramics).

Figure 8:
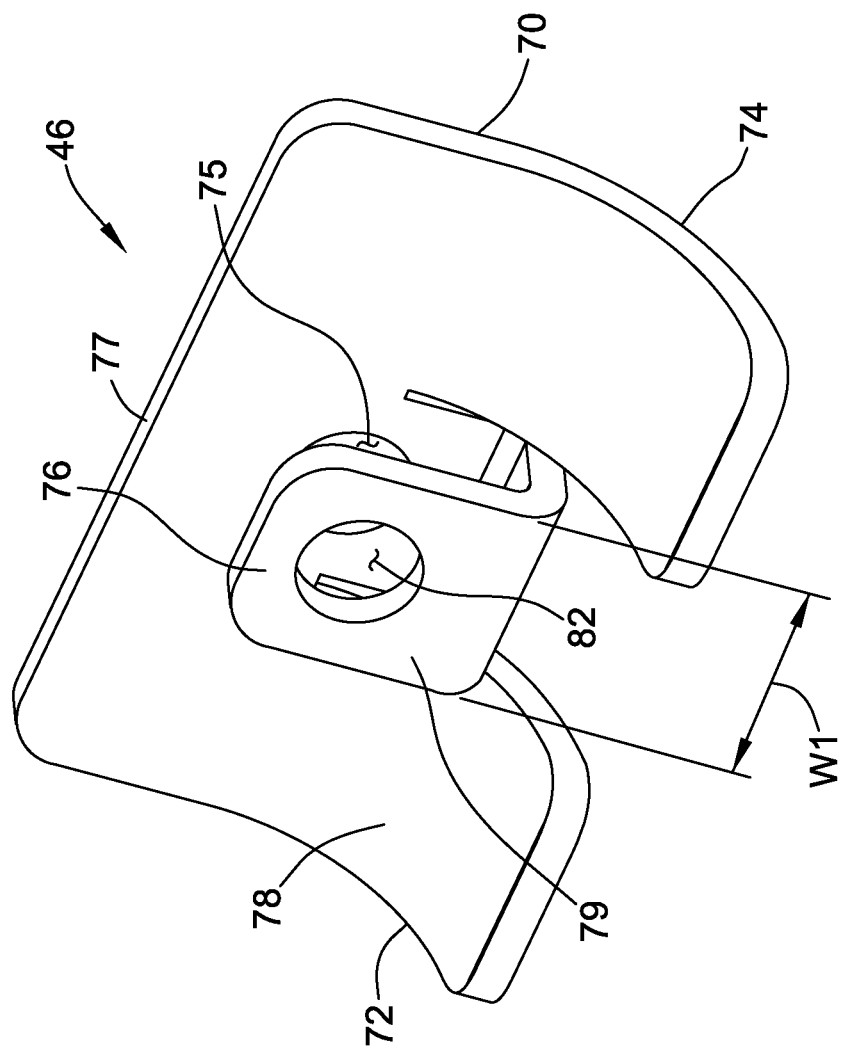
FIG. 8 is a perspective view of a mounting pad of the tine assembly.

The mounting pad 46 includes a body portion or "main body" 70 (FIG. 8). The body portion 70 includes a first actuate leg 72 for mounting between the first coil 60 (FIG. 4) and the tine bar 34 and a second actuate leg 74 (FIG. 8) for mounting between the second coil 62 (FIG. 4) and the tine bar 34. The body portion 70 also includes a body aperture 75 for receiving a fastener 80 (FIG. 9) to attach the body portion 70 to the tine bar 34 (FIG. 4). The aperture 75 is not necessarily circular and, for example, may extend upward to the top 77 of the mounting pad 46 (e.g., the aperture may be in the form of a u-shaped slit in the mounting pad 46).

Figure 9:
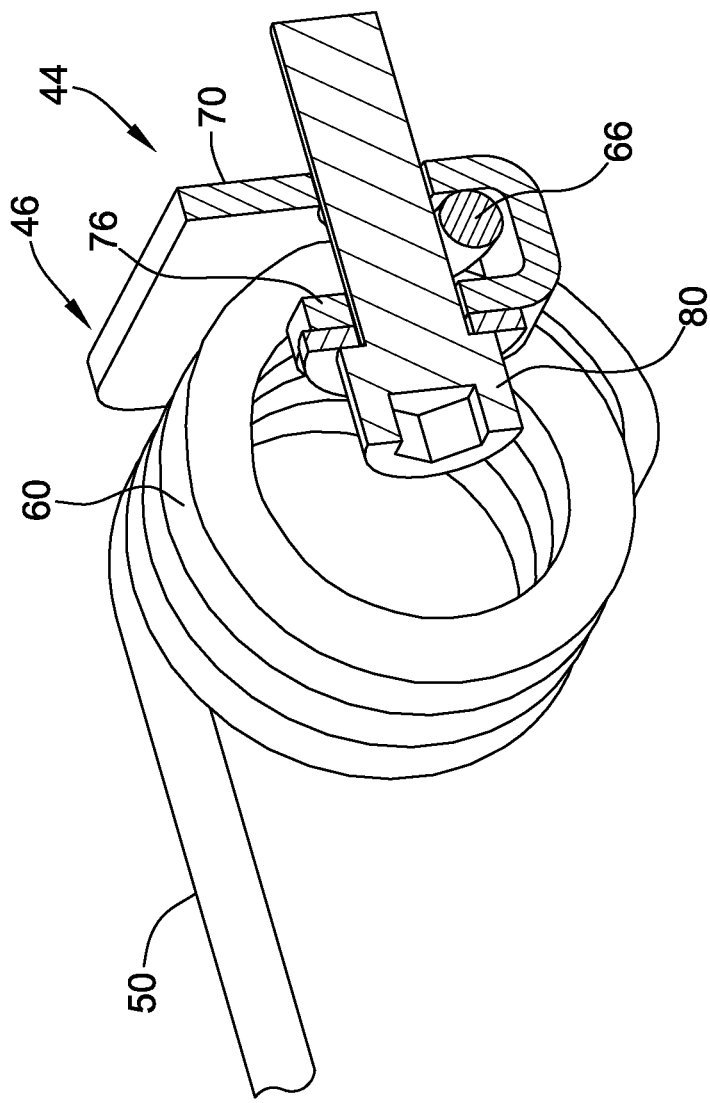
FIG. 9 is a perspective cross-section view of the tine assembly including a fastener.

The mounting pad 46 also includes a tab 76 that extends from the body portion 70 for mounting between a fastener 80 (FIG. 9) and the connecting loop 66. The tab 76 includes a tab aperture 82 (FIG. 8) for receiving the fastener 80 (FIG. 9). The tab 76 has a width W1 that is about equal to or less than the distance D1 (FIG. 7) separating the coils 60, 62 to allow the tab 76 to be looped around the connecting loop 66. The tab 76 and main body 70 have inner surfaces 78 for contacting the tine 32. The main body 78 has an outer surface (not shown) for contacting the tine bar 34. The tab 76 has an outer surface 79 for contacting a fastener 80 (FIG. 9).

Figure 10:
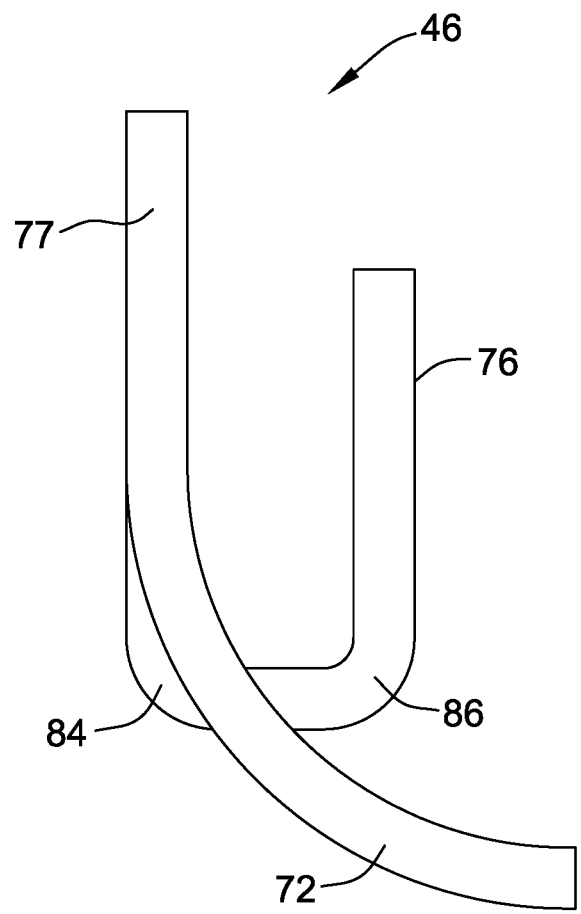
FIG. 10 is a side view of the mounting pad.

The tab 76 may be hinged to the main body 70 to facilitate looping of the tab 76 around the free end 68 (FIG. 7) of the connecting loop 66. As shown in FIG. 10, the mounting pad 46 includes a first hinge 84 and a second hinge 86 which give the tab 76 its u-shape. In some embodiments, the hinges 84, 86 are "living hinges" in which the tab 76 is partially cut so that the pieces are able to bend along the hinge.

In the illustrated embodiment, the body aperture 75 and tab aperture 82 are aligned (or are capable of being aligned by hinges 84, 86) such that a common fastener 80 is used to attach the mounting pad 46 to the tine bar 34 (FIG. 4). In other embodiments, the apertures 75, 82 are not aligned and two or more fasteners are used to secure the mounting pad 46 and/or tine 32 to the tine bar 34. The fastener 80 may be a flanged bolt (i.e., is one piece) or may include a bolt and various separate washers to distribute the closing force of the bolt. Tab 76 is disposed between the flange or washers and the tine bar 34 (FIG. 4).

While the mounting pad 46 is shown as including a body portion 70 and a tab 76, in other embodiments a mounting pad assembly (not shown) is provided in which the body portion 70 and tab 76 are separate pieces.

The mounting pad 46 may have a thickness sufficient to prevent the pad from being worn through and that provides sufficient structure to manipulate the pad to fasten it to the tine bar. For example, the mounting pad 46 may have a thickness of at least about 1/32 inch, at least about 1/16 inch or at least about 1/8 inch.

Generally, the tine 32 does not contact the tine bar 34 (FIG. 4) as the mounting pad 46 is disposed on all contact surfaces of the tine 32. In addition, the tine 32 does not contact the fastener 80 (FIG. 9) as the tab 76 of the mounting pad 46 is between the tine 32 and fastener 80.

In this regard, it should be noted that the mounting pad 46 (e.g., the body portion 70) may have a variety of shapes and geometries.

Figure 11:
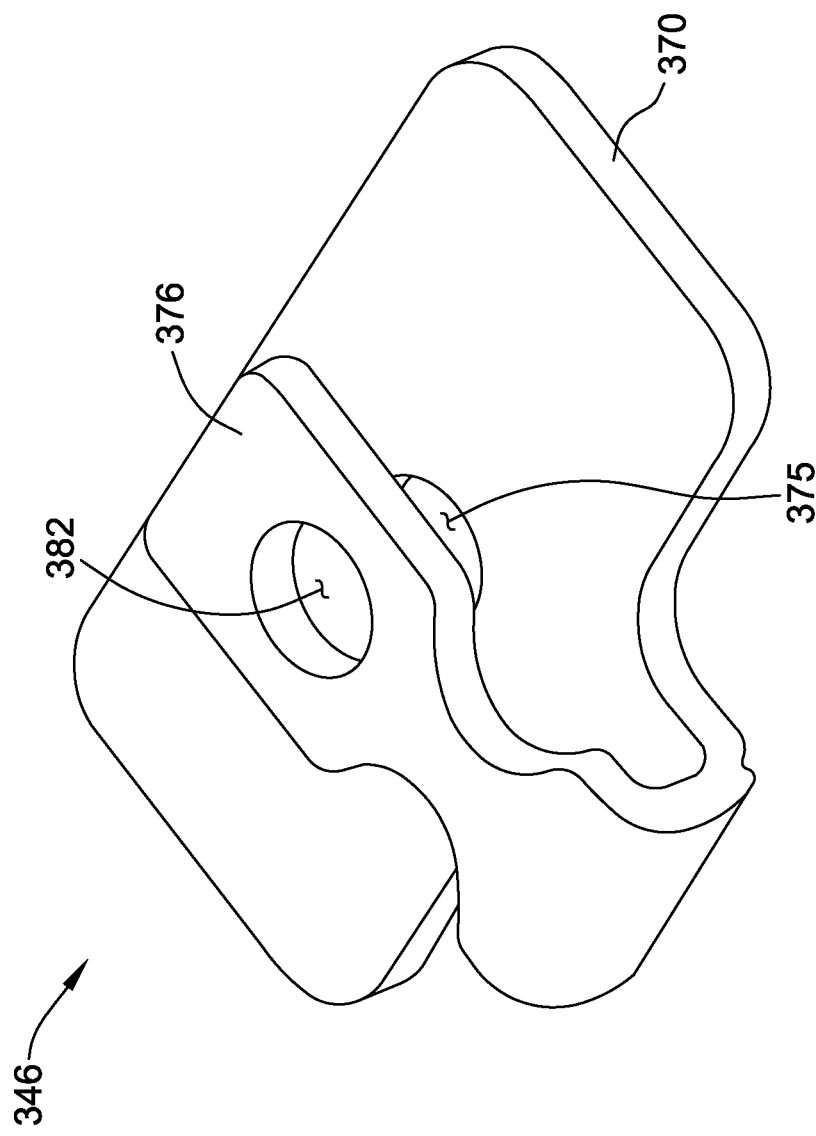
FIG. 11 is another embodiment of a mounting pad.

Another embodiment of the mounting pad generally referenced as "346" is shown in FIG. 11. The mounting pad 346 includes a main body portion 370 having a body aperture 375. A tab 376 extends from the main body 370 and includes a tab aperture 382. Rather than having separate legs 72, 74 as with the mounting pad 46 of FIG. 8, the body portion 370 of the mounting pad 346 of FIG. 11 is a single piece that is disposed between both tine coils 60, 62 (FIG. 7) and the tine bar 34 (FIG. 4). In other embodiments, the body portion 370 is arcuate to better match the shape of the tine coils 60, 62.

Compared to conventional tine mounting assemblies, the tine assembly 44 (FIG. 5) of the present disclosure has several advantages. By using mounting pads 46 between the tine bar 34 and the tines 32, the tines 32 do not contact the tine bar 34, which prevents and/or greatly reduces wear of the tines and formation of stress risers which cause the tine to fracture. By using a mounting pad 46 with arcuate legs 72, 74, the mounting pad 46 may prevent the coils 60, 62 from contacting both the base 40 and sidewall 42 of the tine bar 34. The mounting pad tab 76 allows the tine 32 to be secured by a fastener 80 (FIG. 9) without the fastener contacting the tine 32 which may wear the tine and produce stress risers at the contact point. The mounting pad 46 may also act as a damping agent to decrease the spring energy and shock loads the tine coils 60, 62 experience during pull-back and extension. The mounting pad 46 may also greatly reduce the amount of fretting corrosion caused by the coils rubbing directly on the tine support 34.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A pick-up device of a crop implement, the pick-up device comprising:
   a tine support;
   a tine mounted to the tine support, the tine comprising:
      a coil having an outer coil surface and an inner coil surface;
      an arm that extends from the coil; and
      a connecting loop extending from the coil; and
   a mounting pad comprising:
      a body portion having an inner pad surface and an opposing outer pad surface, the inner pad surface being in contact with the outer coil surface and the outer pad surface being in contact with the tine support; and
      a tab connected to and extending from the body portion for mounting between a fastener and the connecting loop, the body portion and tab being a single piece.

2. The pick-up device as set forth in claim 1 wherein the tab is looped around the connecting loop, the body portion having a body aperture and the tab having a tab aperture, the body aperture and the tab aperture being aligned to allow a common fastener to attach the mounting pad to the pick-up device.

3. The pick-up device as set forth in claim 2 further comprising a fastener, the fastener being received in the body aperture and the tab aperture.

4. The pick-up device as set forth in claim 1 wherein the arm is a first arm and the coil is a first coil, the tine further comprising a second coil having an outer coil surface and an inner coil surface, the inner pad surface being in contact with the outer coil surface of the second coil, the connecting loop joining the first coil and the second coil.

5. The pick-up device as set forth in claim 4 wherein the mounting pad comprises:
   a first arcuate leg that contacts the first coil and the tine support; and
   a second arcuate leg that contacts the second coil and the tine support.

6. The pick-up device as set forth in claim 5 wherein the first coil and the second coil are separated by a distance D1, the tab having a width that is about D1 or less.

7. The pick-up device tiac assembly as set forth in claim 1 wherein the tab is hinged to the body portion to allow the tab to bend relative to the body portion when mounting the tine to the tine support.

8. The pick-up device as set forth in claim 1 wherein the mounting pad comprises at least one of a polymer and a self-lubricating material.

9. The pick-up device as set forth in claim 1 wherein the tine comprises metal.

10. The pick-up device as set forth in claim 1 wherein the tine does not contact the tine support.

11. The pick-up device as set forth in claim 2 comprising the fastener, the fastener extending through the body aperture and the tab aperture, the fastener not contacting the tine.

12. An implement for baling crop material, the implement comprising the pick-up device of claim 1.

13. The pick-up device as set forth in claim 1 wherein the connecting loop has an inner loop surface and having an outer loop surface, the tab being in contact with the inner loop surface.

14. A pick-up device of a crop implement, the pick-up device comprising:
- a tine support;
- a metal tine comprising:
  - a coil;
  - an arm that extends from the coil; and
  - a connecting loop extending from the coil for attaching the tine to the tine support;
- a mounting pad disposed between and contacting the connecting loop and the tine support, the mounting pad being made of at least one of a polymer and a self-lubricating material, the mounting pad comprising:
  - a body portion for mounting between the coil and the tine support, the body portion having a body aperture; and
  - a tab connected to and extending from the body portion, the body portion and tab being a single piece, the tab having a tab aperture; and
- a fastener that extends through the tab aperture, connecting loop and the body aperture, the fastener directly attaching the tine to the tine support and causing the mounting pad to be sandwiched between the tine and the tine support.

15. The pick-up device as set forth in claim 14 wherein the mounting pad is made of a polymer.

16. The pick-up device as set forth in claim 14 wherein the arm is a first arm and the coil is a first coil, the tine further comprising a second coil and a second arm that extends from the second coil, the connecting loop joining the first coil and the second coil, the mounting pad being adapted for mounting between the first and second coils and the tine support.

17. The pick-up device as set forth in claim 16 wherein the mounting pad comprises:
- a first arcuate leg for mounting between the first coil and the tine support; and
- a second arcuate leg for mounting between the second coil and the tine support.

\* \* \* \* \*